(12) United States Patent
Berton et al.

(10) Patent No.: US 6,382,681 B1
(45) Date of Patent: May 7, 2002

(54) DEVICE FOR CRIMPING OR COUPLING END ELEMENTS OF A FLEXIBLE FLOWLINE

(75) Inventors: Hugues Berton, La Mailleraye-sur-Seine; Jean Rigaud, Rouen; Eric Buon, Mont-Saint-Aignan, all of (FR)

(73) Assignee: Coflexip (FR)

( * ) Notice: Subject to any disclaimer, the term of this patent is extended or adjusted under 35 U.S.C. 154(b) by 0 days.

(21) Appl. No.: 09/719,450

(22) PCT Filed: Aug. 6, 1999

(86) PCT No.: PCT/FR99/01954

§ 371 Date: Dec. 12, 2000

§ 102(e) Date: Dec. 12, 2000

(87) PCT Pub. No.: WO00/09933

PCT Pub. Date: Feb. 24, 2000

(30) Foreign Application Priority Data

Aug. 12, 1998 (FR) ............................................. 98 10334

(51) Int. Cl.[7] ............................ F16L 25/00; F16L 33/26
(52) U.S. Cl. ..................... 285/222.1; 285/239; 285/251; 29/890.144
(58) Field of Search .......................... 285/222.1–222.5, 285/238, 239, 251, 256, 255, 249, 903; 29/890.144

(56) References Cited

U.S. PATENT DOCUMENTS

| | | | | |
|---|---|---|---|---|
| 959,187 A | * | 5/1910 | Witzenmann | 285/222.1 |
| 1,051,046 A | * | 1/1913 | Witzenmann | 285/222.1 |
| 1,588,606 A | * | 6/1926 | Oden | 285/222.1 |
| 1,651,022 A | * | 11/1927 | Fulton | 285/222.1 |
| 1,740,664 A | * | 12/1929 | Muehlberg | 285/222.1 |
| 1,977,219 A | * | 10/1934 | Williams | 285/222.1 |
| 2,040,834 A | * | 5/1936 | Cowles | 285/256 |
| 2,394,632 A | | 2/1946 | Parker | 285/72 |
| 2,798,744 A | * | 7/1957 | Budnick | 285/222.1 |
| 2,858,147 A | * | 10/1958 | Guarnaschelli | 285/222.1 |
| 3,459,233 A | | 8/1969 | Webbe | 138/131 |
| 4,033,612 A | * | 7/1977 | Chevalier | 285/297 |
| 4,773,452 A | | 9/1988 | Dotti et al. | 138/109 |
| 4,805,942 A | * | 2/1989 | Goodridge | 285/222.1 |
| 4,950,001 A | | 8/1990 | Briggs | 285/149 |
| 5,860,682 A | * | 1/1999 | Belcher | 285/222.1 |
| 6,273,142 B1 | * | 8/2001 | Braad | 285/222.1 |

FOREIGN PATENT DOCUMENTS

| | | |
|---|---|---|
| CA | 734830 | 5/1966 |
| FR | 2743614 | 7/1997 |
| GB | 586488 | 8/1944 |
| GB | 804583 | 11/1958 |
| GB | 885972 | 1/1962 |
| WO | 9701058 | 1/1997 |

* cited by examiner

*Primary Examiner*—Eric K Nicholson
(74) *Attorney, Agent, or Firm*—Ostrolenk, Faber, Gerb & Soffen, LLP

(57) ABSTRACT

A device for crimping or coupling end elements of a flexible pipe. The pipe includes a metal carcass of a helically wound wire wherein the winding provides gaps between adjacent windings. A sealing sheath outward of the carcass. The device comprises a cylindrically shaped tubular nipple that fits over the carcass with a tapered first conical leading end that is insertable between the sealing sheath and the carcass. The nipple has over a portion of its external surface grooves which substantially match in shape the squeezed out or crept parts of the sheath such that after the nipple has been installed at least part of the squeezed out crept parts of the sheath are almost completely housed in the grooves of the nipple.

13 Claims, 3 Drawing Sheets

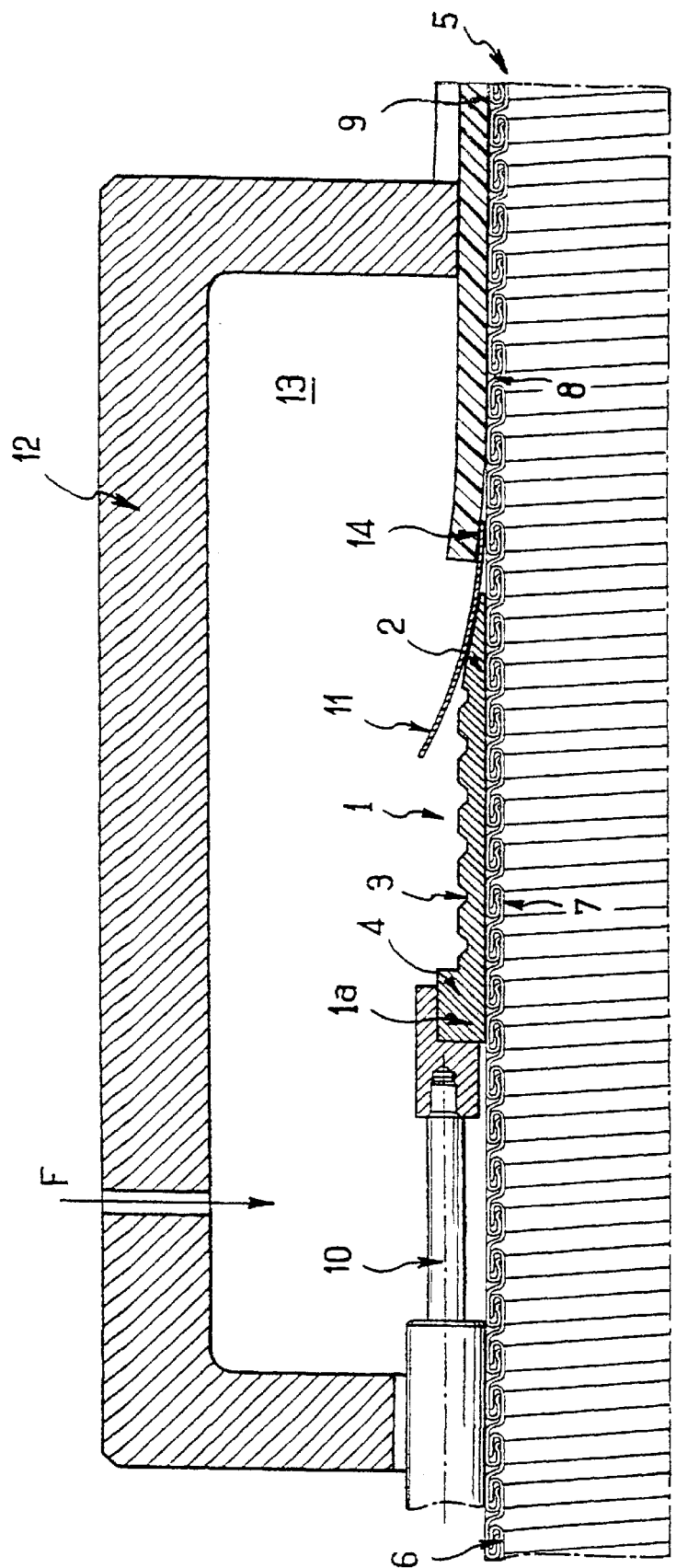
FIG_1

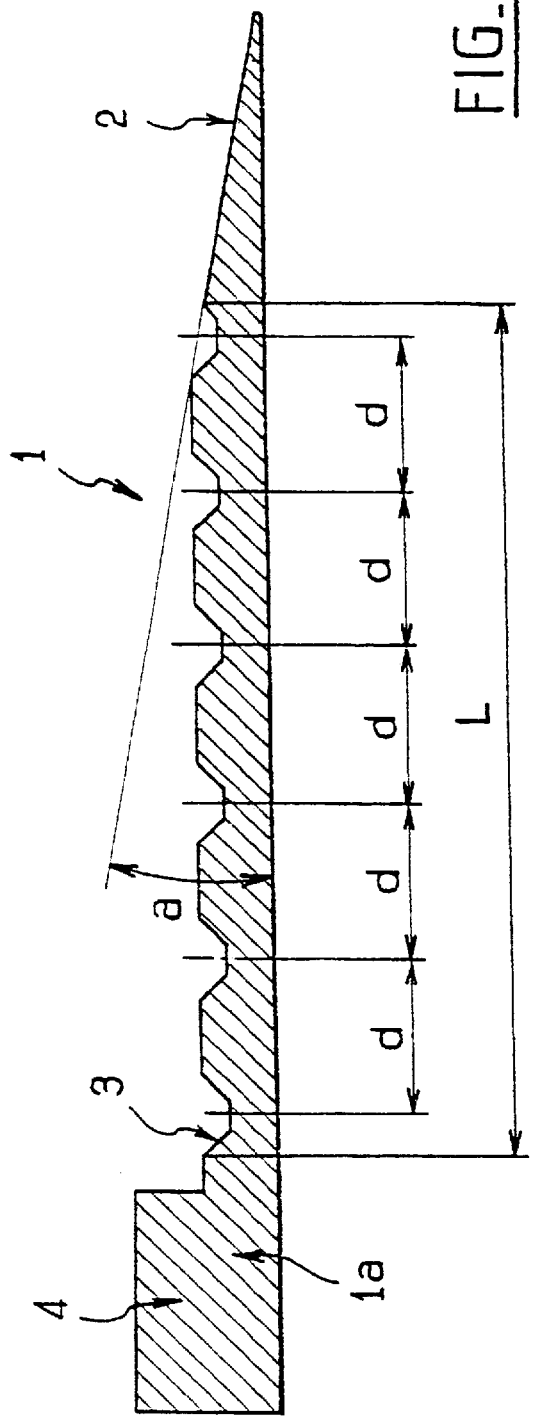
FIG._2
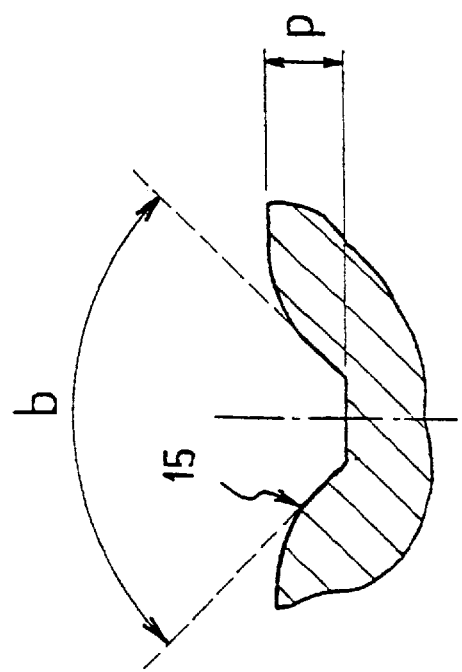
FIG._4

DEVICE FOR CRIMPING OR COUPLING END ELEMENTS OF A FLEXIBLE FLOWLINE

BACKGROUND OF THE INVENTION

The present invention relates to a device for crimping or coupling end elements of a flexible pipe, the innermost element of which consists of a metal carcass, and to a method for implementing this device at the end of a flexible pipe.

A flexible pipe known as a rough bore generally comprises, as innermost elements, at least one internal metal carcass made of a spiral winding of a shaped filament such as a profiled and interlocked strip and a sealing sheath arranged over the metal carcass.

The present invention chooses to consider a flexible pipe whose metal carcass has discontinuities between the turns, the sealing sheath comprising, at each discontinuity, a crept part which at least partially fills the corresponding discontinuity.

These pipes often need to be coupled end to end with other pipes of the same diameter or of a different diameter or alternatively with another fixed structure, the couplings or joints being provided by an end fitting associated with the end of the pipe that is to be coupled.

The flexible pipe has to be fixed to each end fitting in such a way as to allow the continuity of the seal of the flexible pipe and the reaction of tensile loadings due to the bottom effect, which loadings are fully reacted by the tensile armor layers as is known.

Sealing between the end fitting and the sealing sheath is provided by means of a metal bushing with a roughly conical external surface, slipped and crimped onto the sealing sheath. The metal bushing also holds the sealing sheath axially in the connecting end fitting by opposing the residual axial stresses due to the specific method used to manufacture the flexible pipe. The sealing sheath is trapped between the metal bushing and the metal carcass, the latter having sufficient mechanical strength to withstand the crimping of the metal bushing.

The various elements involved in connecting between the end fitting and the end of the flexible pipe that is to be connected are described and depicted in FR-2 743 614 which is incorporated into the current application as regards those common parts which are needed for understanding the connection between an end of a flexible pipe and an end fitting.

That document also recommends the insertion of a tubular insert known as a hollow nipple between two layers consisting of a sacrificial sublayer in contact with the internal metal carcass and a sealing barrier, the sacrificial sublayer being intended to prevent the sealing barrier from creeping into the discontinuities between the turns of the metal carcass. The hollow nipple as described in that document has a tubular cylindrical central part and a rear end which tapers to a bevel, delimited on the outside by a conical surface with a vertex angle of between 3 and 30°. At the front end the hollow nipple has a shoulder, said shoulder defining an end stop for the sealing barrier. Furthermore, the hollow nipple is axially in abutment against a retaining ring secured to the front end of the internal metal carcass, said retaining ring in turn being secured to the end fitting.

Whatever the embodiment described in FR-2 743 614, the sealing barrier is not crimped directly onto the internal metal carcass but is crimped via a sacrificial layer arranged around said metal carcass. As a result, crimping is plastic to plastic, even in the case of the hollow nipple because the latter is inserted between the sealing barrier and the sacrificial layer.

WO 97/01 058 proposes a sealing system consisting of a sleeve which is inserted between the internal metal carcass and the barrier layers arranged adjacent to said metal carcass. The sleeve is cylindrical over practically its entire length and comprises a toothing on its external face adjacent to the lower barrier layer so as to hold said lower layer firmly and prevent it from slipping. In another embodiment, the sleeve has an end which is toothed in the manner of a saw and which cuts the lower barrier layer after insertion and rotation. A metal ring or bush crimps the barrier layers onto the cylindrical sleeve. The cylindrical sleeve also comprises a snap connector at one of its ends to secure the sleeve to the body of the end fitting.

These sealing devices or systems are ill suited to flexible pipes comprising a sealing sheath or barrier which has crept into the discontinuities between the turns of the internal metal carcass. This is because forcibly inserting the cylindrical sleeves or hollow nipples of the prior art somewhat damage the sealing barrier or sheath at the bulges or crept zones. Now, the even partial destruction of these crept zones may give rise to loss of sealing between the flexible pipe and the end fitting, for example following the creation of cracks in the sealing sheath. What is more, the forcible introduction of the hollow nipple or of the sleeve between the sealing sheath and the metal carcass causes lumps to form on the exterior surface of said sheath, in the region of the creep bulges or crept zones. The formation of these lumps if the creep bulges are not cut off is a drawback because either the clamping bush slipped onto the internal sleeve will not fulfil its role entirely because it needs to have an inside diameter at least equal to the outside diameter of the sheath in the region of said lumps in order easily to be slipped around the sheath, or the inside diameter is smaller than the outside diameter at the lumps and therefore the bush is not easy to slip on unless the creep bulges are cut off to obtain a roughly cylindrical external sheath surface in the region of the hollow nipple.

Other systems are described in U.S. Pat. No. 4,950,001, CA 734 830, U.S. Pat. Nos. 4,773,452 and 2,394,632. Such systems have a certain number of drawbacks and, in particular, they dictate tricky fitting of multi-part connection elements which do not naturally fit the end of the tube. These solutions entail not only inserting a coupling device within the constituent layers of the flexible pipe, but also screwing a nut on, sometimes with the addition of elements for reinforcing the pipe/coupling device connection, such as a curable powder or resin. In some instances, fitting the coupling device onto the end of the pipe is even irreversible or alternatively damages the constituent layers at the end of the pipe.

GB 586 488 discloses a system comprising a neck which is inserted between the metallic carcass and the sealing sheath. Nevertheless, the sealing sheath is on a smooth surface of the neck which creates bases at the locations of the creep areas.

The object of the present invention is to overcome the aforementioned drawbacks and to provide a simple crimping or coupling device which readily fits the end of a flexible pipe while at the same time maintaining the integrity of the internal sealing sheath.

The subject of the present invention is a device for crimping or coupling end elements of a flexible pipe which comprises a cylindro-frustoconical hollow nipple tapered at one end, part of said hollow nipple being inserted through the tapered end between the sealing sheath and the metal carcass, and which is characterized in that the hollow nipple has, over at least a portion of the inserted part, grooves which roughly correspond, in terms of shape, with the crept parts of the sealing sheath, so that once the hollow nipple has been introduced, at least some of said crept parts are almost entirely housed in the grooves of the hollow nipple.

Thus, the sealing sheath is not damaged at the bulges or creep zones in the discontinuities between the turns of the carcass and the external surface of the sheath in the region of the hollow nipple is practically cylindrical, which makes it easier for the clamping bush to be slipped onto said internal sheath.

According to another feature, the profile of the grooves of the hollow nipple is of trapezoidal shape open on the face that receives the crept parts of the sealing sheath. This opening of the groove makes it even easier for the crept parts of the hollow nipple to be introduced into said grooves as it gradually penetrates between the internal sealing sheath and the metal carcass.

According to another feature, the free edges of the grooves of the hollow nipple are rounded. As the hollow nipple is introduced between the sheath and the carcass, the crept parts of the sheath are then advantageously guarded against any damage by being chopped off or torn off by grooves which might otherwise be sharp-edged. The risk of damage to the crept parts of the sheath by the free edges of the grooves is also lower once the hollow nipple has been fully introduced.

According to another feature, the depth of the grooves of the hollow nipple is at least equal to the height of the crept part of the sealing sheath. The grooves thus have sufficient depth for the crept part of the sheath to be able to enter them easily over its entire height without possibly being compressed.

According to another feature, the angular aperture of the profile of the grooves of the hollow nipple is about 90°. This angular aperture is wide enough for the crept parts of the sheath to easily enter the grooves of the hollow nipple.

According to another feature, the vertex angle of the tapered end of the hollow nipple is between 5 and 30°. A small vertex angle also makes the hollow nipple easier to introduce into the flexible pipe, making insertion, to some extent, gradual.

Another subject of the present invention is a method for introducing the device into the end of a flexible pipe, said method being characterized in that it consists in heating the sealing sheath so as to soften at least the crept parts over the entire slip-on length of the hollow nipple, and in introducing the hollow nipple while said sheath is softened.

According to another feature, the system for heating the sheath consists of a chamber containing a certain volume surrounding part of the sheath at least in the region of the introduction zone, hot air being introduced into said volume to heat said part of the sheath. This simple device is easy to fit and allows the sheath to be heated uniformly at the introduction zone.

The invention will be better understood with the aid of the description which follows, with reference to the appended diagrammatic drawings depicting, by way of example, one embodiment of a device for crimping or coupling end elements of a flexible pipe. Other advantages and features will come to light upon reading the description.

BRIEF DESCRIPTION OF THE DRAWINGS

FIG. 1 is a partial view of the crimping or coupling device when it is in the process of being fitted on a flexible pipe with an internal metal carcass.

FIG. 2 is a partial section of the crimping or coupling device according to the invention.

FIG. 4 is a view of one possible shape of a profile of a groove.

DESCRIPTION OF A PREFERRED EMBODIMENT

Figure 3:
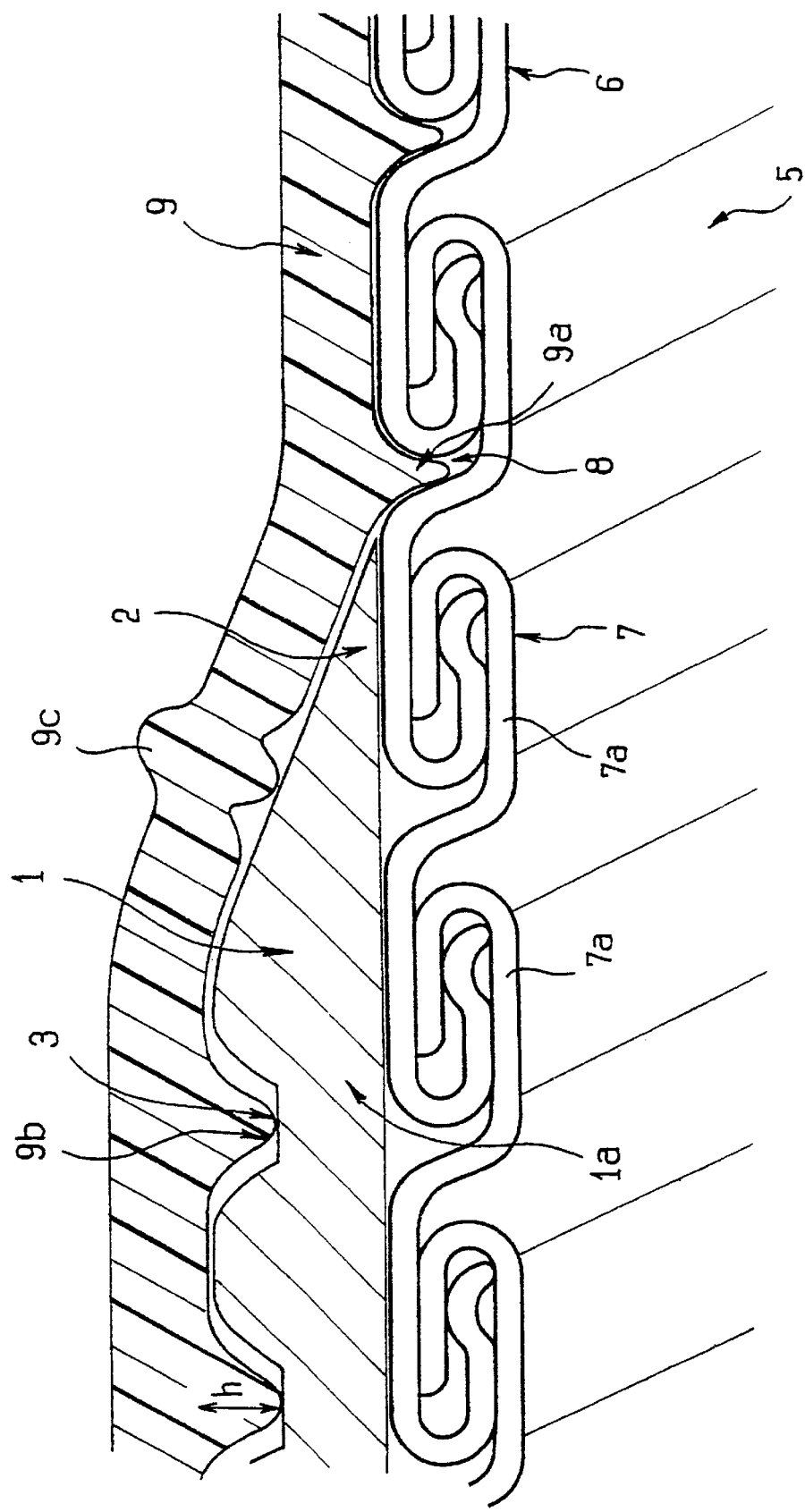
FIG. 3 is a partial view of the crimping or coupling device of FIG. 2 introduced between the metal carcass and the sealing sheath of the flexible pipe.

In general and before fitting an end fitting, the flexible pipe is cut at the end which is to be inserted into the end fitting. In another stage, various phases are performed during which it is necessary, on the one hand, to keep the various constituent layers of the flexible pipe still to prevent them from moving and/or deforming and, on the other hand, to crimp some of said layers so as to provide sealing at the end of the pipe. All of these operations and means to be employed when connecting the end of the flexible pipe and the end fitting are described in FR-2 743 614 which is incorporated into the current application as regards said operations and fixing means. Likewise, the hollow nipple according to the present invention and which will be described hereinbelow is also in abutment against a retaining ring or cleanliness ring as described in the aforementioned document.

The crimping or coupling device 1 according to the invention is depicted in the process of being fitted on the flexible pipe 5 in FIG. 1. The pipe 5 comprises, by way of innermost elements, an internal metal carcass 6 formed by helical winding of an interlockable shaped filament or profiled and interlocked strip 7 comprising discontinuities 8 between the consecutive turns 7a, and a sealing sheath 9 arranged over the metal carcass 6 and comprising, at each discontinuity 8, a crept part 9a which at least partially fills the corresponding discontinuity 8.

The crimping or coupling device (FIG. 2) consists of a cylindro-frustoconical hollow nipple 1a, tapered at its end 2 and comprising grooves 3 in a helical winding and a connecting flange 4. The pitch at which the grooves 3 are wound is constant at a length d, this pitch corresponding to the pitch with which the spiral-wound strip 7 of which the metal carcass is made is wound. The pitch of the grooves 3 is determined by measuring the pitch at which the metal carcass 6 is wound at the end of the flexible pipe, the pitch of the grooves including the manufacturing tolerances on the average pitch of the carcass.

The crimping or coupling device 1 is introduced using rams 10 between the metal carcass 6 and the sealing sheath 9, possibly using an nipple inserter 11 to improve the introduction of the nipple, the nipple inserter 11 being removed once the frustoconical part of the end 2 of the hollow nipple has been introduced.

The grooves 3 roughly correspond in terms of shape with the crept parts 9a of the sealing sheath 9, so that once the hollow nipple 1a has been introduced, at least some of said crept parts 9b are housed almost entirely in the grooves 3 of the nipple 1a. Thus, the hollow nipple 1a, blocked in its movement by the crept parts 9b, is held effectively in connection with the end of the flexible pipe 5.

Use may be made of a device 12 for heating the sheath, this being formed by a chamber containing a certain volume 13 surrounding part of the sheath at least in the region of the introduction zone 14 for the hollow nipple 1a, hot air indicated by an arrow F being introduced into the volume 13. This heating softens at least the crept parts 9a, 9b of the sheath which can be pushed back as the hollow nipple 1a passes, making its insertion easier while at the same time better sparing said crept parts from the risk of damage by cutting or tearing by said hollow nipple 1a. As a preference, the sheath is softened throughout its thickness to make the expansion of said sheath easier.

FIG. 4 depicts the profile of a groove 3 of the hollow nipple according to a preferred embodiment. The profile of the groove 3 is of trapezoidal shape and open on the face that takes the crept parts 9a, 9b of the sealing sheath 9. The free edges 15 of the grooves 3 of the hollow nipple 1a are rounded, the crept parts 9a, 9b of the sheath 9 are therefore better spared from any damage by cutting or tearing which might be occasioned by the sharp-edged grooves, it also being easier for the crept parts 9a, 9b to enter the grooves 3 of the hollow nipple 1.

As a preference, the depth p of the groove 3 of the hollow nipple 1a is at least equal to the height h of the crept part 9a, 9b of the sealing sheath 9. The grooves 3 are deep enough that the crept part 9a, 9b of the sheath 9 can easily be housed therein over its entire height without possibly being compressed. In addition, the formation of lumps 9c in the grooved part of the hollow nipple is prevented, said lumps appearing only in the region of the frustoconical part 2, and this has no influence on the slipping on of the clamping bush which rests on the cylindrical part of the hollow nipple.

The angular aperture b of the profile of the grooves 3 of the hollow nipple 1a depends on the shape of the crept parts and is between 60 and 120° and preferably about 90°. This angular aperture allows the crept parts 9b of the sheath 9 to easily enter the grooves 3 of the hollow nipple 1a while guaranteeing that the crept parts are effectively held in said grooves 3, the hollow nipple 1a being in place within the pipe 5.

The vertex angle a of the tapered end 2 of the hollow nipple 1a is between 5 and 30°. A fairly acute vertex angle also makes the hollow nipple 1a easier to introduce into the flexible pipe 5, offering insertion which is to some extent gradual.

The above description to illustrate the invention should not be understood as limiting its scope. Hence, the crimping or coupling device according to the invention may also be used for pipes comprising a sheath over a pressure vault between which items the hollow nipple 1a is introduced, it being possible for the pressure vault to have turns and discontinuities between said turns, the sheath possibly comprising, at each discontinuity, a crept part at least partially filling the corresponding discontinuity.

What is claimed is:

1. A device for crimping or coupling end elements of a flexible pipe, wherein the end elements include a metal carcass comprised of a helically wound filament having a gap between successive turns of the helix, the end elements further comprise a sealing sheath over the metal carcass, wherein the sheath includes a crept part at the gap between successive turns and the crept part at least partially fills the gap;

the device comprising a hollow nipple which is generally cylindrical in shape and having a conically tapered leading end, wherein the leading end of the nipple is inserted between the sealing sheath and the carcass;

the nipple having an interior side through which the carcass extends and having an exterior side toward the sheath;

the nipple having grooves defined in the exterior side which generally correspond in shape and location along the nipple with the crept parts of the sheath, such that upon introduction of the nipple between the carcass and the sheath, at least some of the crept parts are housed in the grooves of the nipple.

2. The device of claim 1, wherein the grooves in the exterior side of the nipple are of generally trapezoidal cross section, opening wider on the exterior side that receives the crept parts of the sheath.

3. The device of claim 2, wherein the grooves have free edges at the exterior surface of the nipple and the free edges of the grooves in the nipple are rounded.

4. The device of claim 2, wherein each of the grooves has a depth into the exterior side of the nipple that is at least the height of the respective crept part of the sealing sheath received in the respective groove.

5. The device of claim 4, wherein the angular aperture of the profile of the groove in the nipple is between 60° and 120°.

6. The device of claim 2, wherein the angular aperture of the profile of the groove in the nipple is between 60° and 120°.

7. The device of claim 2, wherein the angular aperture of the profile of the groove in the nipple is about 90°.

8. The device of claim 6, wherein the tapered leading end of the nipple has a vertex angle in range between 5° and 30°.

9. The device of claim 1, wherein the tapered leading end of the nipple has a vertex angle in the range between 5° and 30°.

10. A method for fitting a device for crimping or coupling the end elements of a flexible pipe, wherein the end elements include a metal carcass comprised of a helically wound filament having a gap between successive turns of the helix and a sealing sheath over the metal carcass, wherein the sheath includes a crept part at the gap between successive turns and the crept part at least partially fills the gap, the method comprising:

heating the sealing sheath at a location at and to soften at least the crept parts of the sheath; and thereafter introducing a hollow nipple, with grooves on an external surface of the nipple, between the sheath and the vault after the sheath has been heated so that the grooves align with the gaps.

11. The method of claim 10, further comprising installing the sheath on the carcass before heating the sheath.

12. The method of claim 10, wherein the heating of the sheath comprises placing the part of the sheath to be heated in a chamber which surrounds the sheath in the axial region of the introduction of the nipple between the carcass and the sheath.

13. The method of claim 12, wherein the sheath is heated in the chamber by supplying hot air into the chamber to heat the part of the sheath.

* * * * *